US012682695B2

(12) United States Patent
Echaves

(10) Patent No.: US 12,682,695 B2
(45) Date of Patent: Jul. 14, 2026

(54) SELECTIVE CAPTURE OF WORK MACHINE PRODUCTIVITY FACTORS BASED ON WORK STATE ESTIMATION

(71) Applicant: Deere & Company, Moline, IL (US)

(72) Inventor: Samantha F. Echaves, Dubuque, IA (US)

(73) Assignee: Deere & Company, Moline, IL (US)

( * ) Notice: Subject to any disclaimer, the term of this patent is extended or adjusted under 35 U.S.C. 154(b) by 257 days.

(21) Appl. No.: 18/167,329

(22) Filed: Feb. 10, 2023

(65) Prior Publication Data

US 2024/0273954 A1 Aug. 15, 2024

(51) Int. Cl.

| | |
|---|---|
| ***G07C 5/02*** | (2006.01) |
| ***E02F 3/34*** | (2006.01) |
| ***E02F 9/26*** | (2006.01) |

(52) U.S. Cl.

CPC .................. *G07C 5/02* (2013.01); *E02F 9/26* (2013.01); *E02F 3/34* (2013.01)

(58) Field of Classification Search

CPC ...... G07C 5/02; E02F 9/26; E02F 3/34; E02F 9/264; E02F 9/267

See application file for complete search history.

(56) References Cited

U.S. PATENT DOCUMENTS

| | | | |
|---|---|---|---|
| 5,493,798 | A | 2/1996 | Rocke et al. |
| 6,247,538 | B1 | 6/2001 | Takeda et al. |
| 7,671,725 | B2 | 3/2010 | Tsuji et al. |
| 7,934,329 | B2 | 5/2011 | Mintah et al. |
| 8,843,311 | B2 | 9/2014 | Takeda |
| 8,954,252 | B1 | 2/2015 | Urmson et al. |
| 9,074,546 | B2 | 7/2015 | Asami et al. |
| 9,187,879 | B2 | 11/2015 | Suk |
| 9,415,953 | B2 | 8/2016 | Bonefas |
| 9,712,791 | B2 | 7/2017 | Kim et al. |
| 9,908,385 | B2 | 3/2018 | Chundrlik, Jr. et al. |
| 9,946,451 | B2 | 4/2018 | Kim et al. |
| 10,234,368 | B2 | 3/2019 | Cherney |

(Continued)

FOREIGN PATENT DOCUMENTS

| | | |
|---|---|---|
| JP | 2018145925 A | 9/2018 |
| WO | 2012157381 A1 | 11/2012 |

*Primary Examiner* — James J Lee
*Assistant Examiner* — Alexander George Matta
(74) *Attorney, Agent, or Firm* — Gary L. Montle; Lucian Wayne Beavers; Patterson Intellectual Property Law, PC

(57) ABSTRACT

A computer-implemented system and method are provided for state-based payload capture by a work machine comprising ground engaging units supporting a frame, and a work implement moveable with respect to the frame for loading and unloading payloads. At least a first set of sensors associated with the work machine are used to detect event-based transitions between work states in a defined work cycle having a sequence of work states therein, e.g., from digging states to loaded states. An onboard payload measuring unit is used to selectively capture payload data corresponding to a current work cycle in association with the detected transition. The captured payload data is categorized and stored, independently for the current work cycle with respect to associated locations within a work site and/or with respect to time, and in aggregate with other captured payload data for each of a plurality of work cycles for the work machine.

14 Claims, 5 Drawing Sheets

(56) References Cited

U.S. PATENT DOCUMENTS

| | | | | |
|---|---|---|---|---|
| 10,479,354 | B2 | 11/2019 | Posselius et al. | |
| 11,136,744 | B2 | 10/2021 | Myers et al. | |
| 11,214,939 | B2 | 1/2022 | Remmelmann | |
| 2009/0139119 | A1* | 6/2009 | Janardhan | G01G 19/021<br>37/413 |
| 2014/0107895 | A1* | 4/2014 | Faivre | E02F 9/2029<br>701/50 |
| 2015/0189216 | A1 | 7/2015 | Fukuchi et al. | |
| 2016/0282878 | A1* | 9/2016 | Stratton | G09B 25/06 |
| 2017/0131722 | A1 | 5/2017 | Hiramatsu et al. | |
| 2017/0135277 | A1 | 5/2017 | Hiramatsu et al. | |
| 2018/0035050 | A1 | 2/2018 | Lu et al. | |
| 2019/0114847 | A1* | 4/2019 | Wagner | G05D 1/0038 |
| 2020/0042023 | A1 | 2/2020 | Garvin et al. | |
| 2020/0193342 | A1* | 6/2020 | Selvaraj | G07C 5/0808 |
| 2020/0392703 | A1* | 12/2020 | Sherlock | G01F 15/068 |
| 2021/0040713 | A1* | 2/2021 | Yamanaka | E02F 3/435 |
| 2024/0093464 | A1* | 3/2024 | Sadilek | G06N 3/084 |

* cited by examiner

SELECTIVE CAPTURE OF WORK MACHINE PRODUCTIVITY FACTORS BASED ON WORK STATE ESTIMATION

FIELD OF THE DISCLOSURE

The present disclosure relates generally to work machines for loading and unloading material, and more particularly to systems and methods for selectively capturing productivity factors such as payload data from such a work machine, for example to better categorize or otherwise represent productivity thereof.

BACKGROUND

Work machines as discussed herein may particularly refer to self-propelled four-wheel drive wheel loaders for illustrative purposes, but may also for example include excavator machines, forestry machines, and other equipment or vehicles which modify the terrain or equivalent working environment in some way. These work machines may have tracked or wheeled ground engaging units supporting the undercarriage from the ground surface, and may further include one or more work implements such as for example buckets which are used to carry material from one location for discharging into a loading area such as for example associated with a truck or hopper. However, some work machines which may be within the scope of the present disclosure are not necessarily self-propelled, such as for example knuckle boom loaders and the like.

Conventional onboard payload scales can provide a live record of bucket weight which is used to measure productivity. However, this bucket weight signal is notoriously messy and does not always indicate productive work. For example, pile impacts can cause the measured or calculated bucket weight to spike momentarily, but is not an accurate representation of the weight in the bucket (as represented, e.g., at time 275 in FIG. 5). Additionally, the payload scale in conventional applications will still show the bucket weight during non-productive work, such as for example during pile clean up (as represented, for example, at about time 200 in FIG. 5).

BRIEF SUMMARY

The current disclosure provides an enhancement to conventional systems, at least in part by a state-based payload capturing technique. A work machine may be provided with an onboard model determining its machine operating state using machine learning and onboard sensors (for example, loaded transport, unloaded reverse, dig, dump, etc.). A software algorithm may combine the machine operating state and the onboard payload scale to automatically capture the bucket weight only during defined periods of "productive" work.

Referring again to FIG. 5, this enhancement is illustrated using a comparison between the continuously captured bucket weight (according to conventional systems and techniques) and the selectively captured bucket weight using systems and methods according to the present disclosure.

In one embodiment, a computer-implemented method as disclosed herein is provided for state-based payload capture by a work machine comprising a plurality of ground engaging units supporting a main frame, and at least one work implement moveable with respect to the main frame and configured for loading and unloading a payload. The method may include detecting, at least via one or more sensors associated with the work machine, an event-based transition between work states in a defined work cycle having a sequence of work states therein, selectively capturing payload data corresponding to a current work cycle from an onboard payload measuring unit in association with the detected transition, and categorizing the captured payload data at least in data storage, independently for the current work cycle with respect to one or more associated locations within a work site and/or with respect to time, and in aggregate with other captured payload data for each of a plurality of work cycles for the work machine.

In one exemplary aspect according to the above-referenced embodiment, the method may include detecting the event-based transition from a first specified work state to a second specified work state, wherein the selectively captured payload data is captured during the second specified work state.

In another exemplary aspect according to the above-referenced embodiment, the selectively captured payload data may comprise a representative payload value for the second specified work state.

In another exemplary aspect according to the above-referenced embodiment, payload data may be continuously generated by the onboard payload measuring unit, wherein the selectively captured payload data excludes payload data generated other than in the second specified work state.

In another exemplary aspect according to the above-referenced embodiment, the first specified work state may comprise a loading operation utilizing the at least one work implement.

In another exemplary aspect according to the above-referenced embodiment, the detecting of the event-based transition may comprise: classifying over time combinations of data from the one or more sensors associated with the work machine into different predetermined work states; receiving input signals for a current work cycle from at least one of the one or more sensors; detecting a first specified work state based on a comparison of the received input signals to the classified combinations of data; and detecting a second specified work state based on a subsequent comparison of the received input signals to the classified combinations of data.

In another exemplary aspect according to the above-referenced embodiment, the one or more sensors associated with the work machine may comprise at least one sensor of the onboard payload measuring unit.

In another exemplary aspect according to the above-referenced embodiment, a representative display of the work site may be generated on a display unit, the representative display comprising one or more indicators corresponding to a location and a value of the respective selectively captured payload data.

In another exemplary aspect according to the above-referenced embodiment, the onboard payload measuring unit may comprise one or more position sensors and one or more hydraulic pressure sensors.

In another exemplary aspect according to the above-referenced embodiment, the one or more sensors associated with the work machine may comprise one or more sensors configured to generate output signals representative of wheel speed, positions of the at least one implement, load sense pressure, engine speed, and engine torque.

In another embodiment, a system for state-based payload capture may comprise a work machine with a plurality of ground engaging units supporting a main frame, and at least one work implement moveable with respect to the main frame and configured for loading and unloading a payload.

A first set of one or more sensors associated with the work machine may be configured to generate output signals representative of work states thereof. An onboard payload measuring unit comprising a second set of one or more sensors may be configured to generate output signals representative of a current payload for the at least one work implement. One or more processors functionally linked to each of the sensors may be configured to direct performance of steps in a method according to the above-referenced method embodiment and optionally any of the exemplary aspects thereof.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-7, various embodiments may now be described of an inventive system and method.

Figure 1:
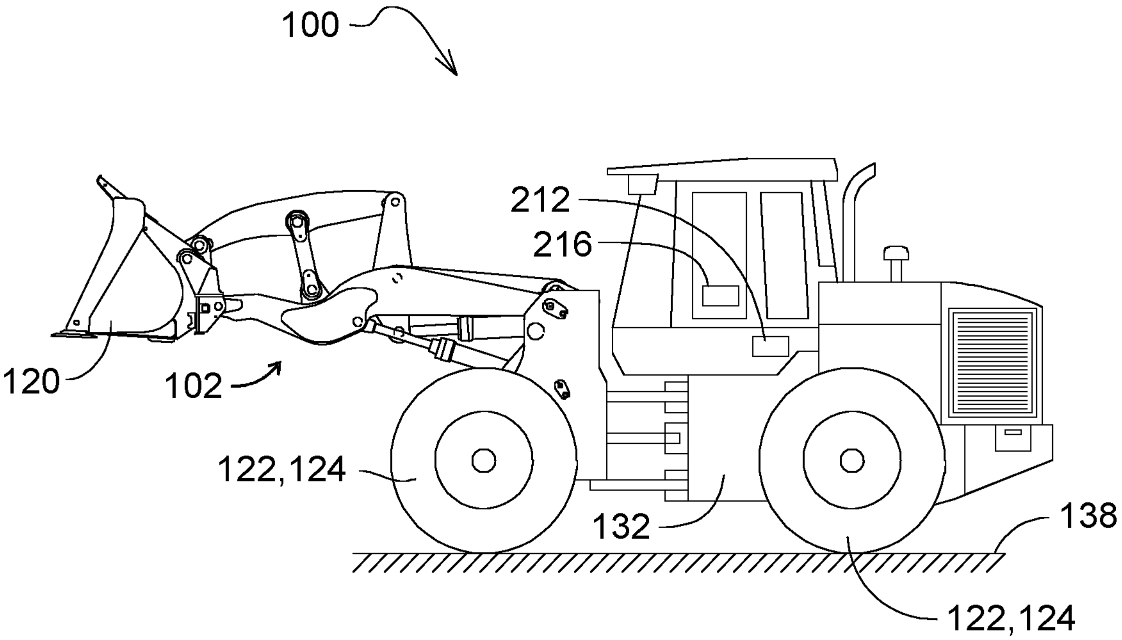
FIG. 1 is a side view of an exemplary embodiment of a self-propelled work machine according to the present disclosure.

FIG. 1 in a particular embodiment as disclosed herein shows a representative work machine 100 in the form of, for example, a four-wheel drive loader having a front-mounted work implement 120 for modifying the proximate terrain. It is within the scope of the present disclosure that the work machine 100 may be in the form of various alternative equipment or vehicles, typically but not exclusively self-propelled in nature, using a work implement to modify the proximate terrain and to carry material from the terrain for loading into a loading area 10, and generally designed for use in off-highway environments such as a construction or forestry work site, for example.

The illustrated work machine 100 includes a main frame 132 supported by a first pair of wheels as left-side ground engaging units 122 and a second pair of wheels as right-side ground engaging units 124, and at least one travel motor (not shown) for driving the ground engaging units.

The work implement 120 for the illustrated self-propelled work machine 100 comprises a front-mounted loader bucket 120 coupled to a boom assembly 102. The loader bucket 120 faces generally away from the operator of the loader 100 and is moveably coupled to the main frame 132 via the boom assembly 102 for forward-scooping, carrying, and dumping dirt and other materials into a loading area such as for example a stationary bin or hopper, or a container integrated with an articulated dump truck. The boom assembly 102 may include one or more boom elements, arms, rockers, linkages, saddles, hydraulic cylinders, mounting brackets, articulation joints, rods, bars, pivot pins, and/or the like. In use of the work machine 100, kinematic characteristics of one or more components of the boom assembly 102 may be measured to evaluate performance of the work machine 100. As further described below, one or more sensors **202*c* may be coupled to the boom assembly 102 and configured to provide dynamic payload input indicative of a variable payload carried by the work implement 120 in use of the work machine 100 to a controller 212 configured or otherwise associated with payload estimation/measurement logic 220**.

In an alternative embodiment wherein the self-propelled work machine is for example a tracked excavator, the boom assembly 102 may be defined as including at least a boom and an arm pivotally connected to the boom. The boom in the present example is pivotally attached to the main frame 132 to pivot about a generally horizontal axis relative to the main frame 132. A coupling mechanism may be provided at the end of the boom assembly 102 and configured for coupling to the work implement 120, which may also be characterized as a working tool, and in various embodiments the boom assembly 102 may be configured for engaging and securing various types and/or sizes of work implements 120.

In other embodiments, depending for example on the type of work machine 100, the work implement 120 may take other appropriate forms as understood by one of skill in the art, but for the purposes of the present disclosure will comprise work implements 120 for carrying material from a first location for discharging or otherwise unloading into a second location as a loading area (e.g., a truck or hopper).

An operator's cab may be located on the main frame 132. The operator's cab and the boom assembly 102 (or the work implement 120 directly, depending on the type of work machine 100) may both be mounted on the main frame 132 so that the operator's cab faces in the working direction of the work implements 120. A control station including a user interface 216 may be located in the operator's cab. As used herein, directions with regard to work machine 100 may be referred to from the perspective of an operator seated within the operator cab; the left of the work machine is to the left of such an operator, the right of the work machine is to the right of such an operator, a front-end portion (or fore) of the work machine is the direction such an operator faces, a rear-end portion (or aft) of the work machine is behind such an operator, a top of the work machine is above such an operator, and a bottom of the work machine below such an operator.

A user interface 216 as described herein may be provided as part of or otherwise include a display unit 210 configured to graphically display indicia, data, and other information, and in some embodiments may further provide other outputs from the system such as indicator lights, audible alerts, and the like. The user interface 216 may further or alternatively include various controls or user inputs (e.g., a steering wheel, joysticks, levers, buttons) 208 for operating the work machine 100, including operation of the engine, hydraulic cylinders, and the like. Such an onboard user interface 216 may be provided as part of or otherwise functionally linked to a vehicle control system 200 via for example a CAN bus arrangement or other equivalent forms of electrical and/or electro-mechanical signal transmission. Another form of user interface (not shown) may take the form of a display unit that is generated on a remote (i.e., not onboard) computing device, which may display outputs such as status indications and/or otherwise enable user interaction such as the providing of inputs to the system. In the context of a remote user interface, data transmission between for example the vehicle control system and the user interface may take the form of a wireless communications system and associated components as are conventionally known in the art.

Figure 2:
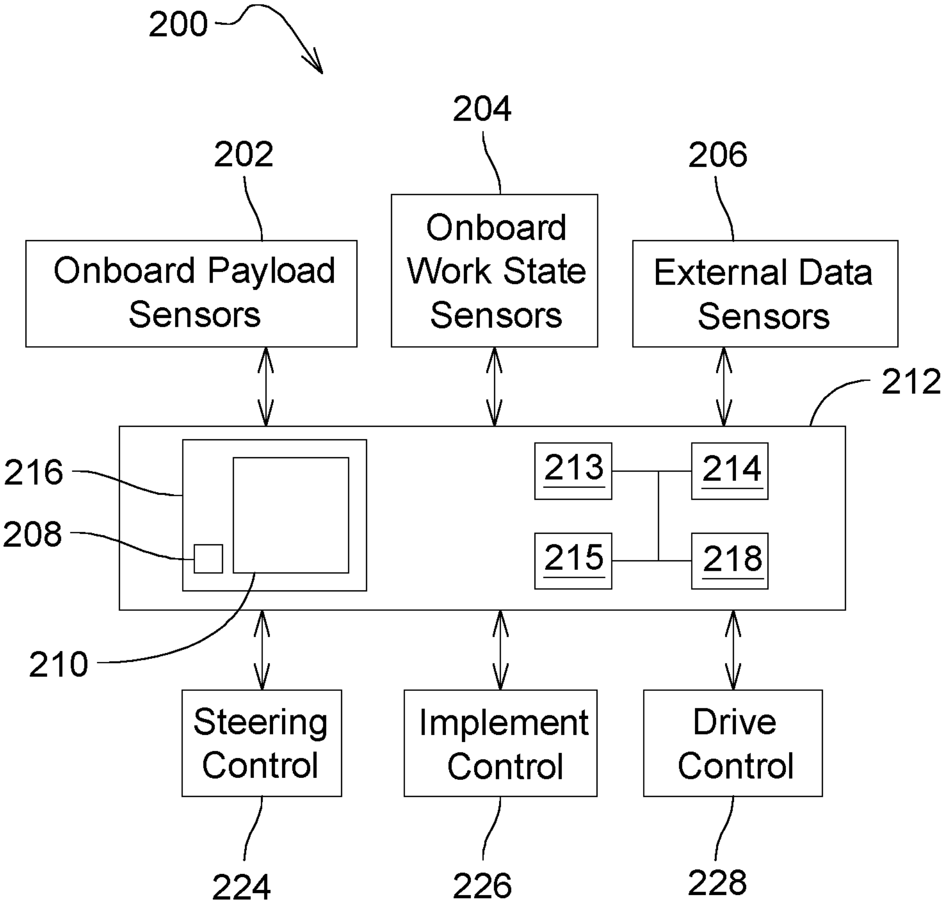
FIG. 2 is a block diagram representing a control system according to an embodiment of the present disclosure.

As schematically illustrated in FIG. 2, the work machine 100 includes a control system 200 including a controller 212. The controller 212 may be part of the machine control system of the work machine 100, or it may be a separate control module. The controller 212 may include the user interface 216 and optionally be mounted in the operator cab at a control panel.

The controller 212 is configured to receive inputs from some or all of various data sources such as onboard payload sensors 202, onboard work state sensors 204, and external data sensors 206 such as for example from a remote computing device, the user interface, and/or a machine control system for the work machine if separately defined with respect to the controller.

Figure 3:
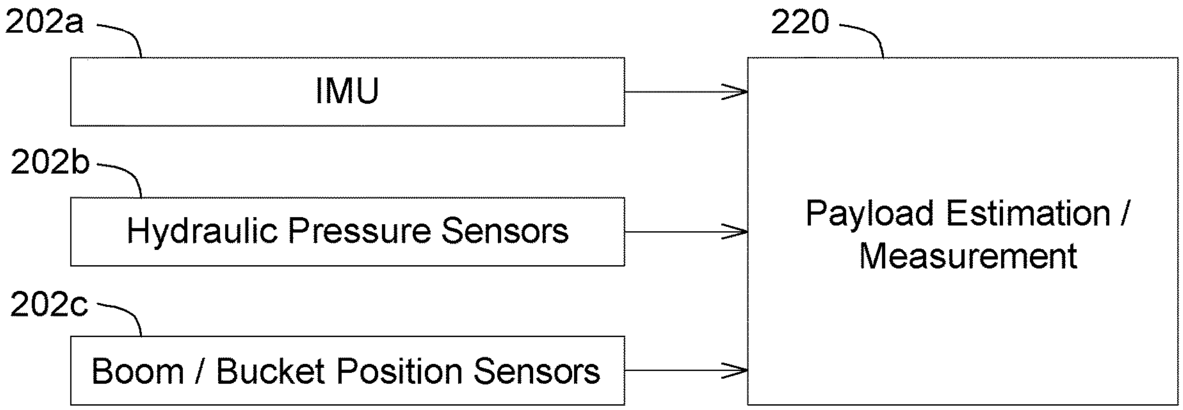
FIG. 3 is a block diagram representing exemplary inputs to payload estimation/measurement logic according to an embodiment of the present disclosure.

As represented in FIG. 3, exemplary onboard payload estimation and/or measurement sensors 202 in an embodiment wherein the work machine 100 is a four-wheel drive loader may comprise inertial measurement units (IMUs) 202*a* mounted to respective work machine 100 components, such as for example the work implement 120 and/or boom assembly 102 and/or main frame 132, hydraulic pressure sensors 202*b*, and/or other position sensors 202*c* associated with the boom assembly 102 and/or work implement 120. It may be understood that alternative sensors/data sources may be utilized as payload estimation and/or measurement sensors 202 for different types of work machines 100 such as excavators, feller bunchers, skid steer loaders, and the like.

The hydraulic pressure sensors 202*b* may be configured to provide pressure input indicative of, for example, hydraulic pressure in one side of a corresponding hydraulic cylinder of the boom assembly 102. The other sensors 202*c* may for example include sensors coupled to piston-cylinder units to detect the relative hydraulically actuated extensions thereof, imaging devices, and/or any known alternatives as may be known to those of skill in the art to provide position or movement input indicative of a position (e.g., angular position or displacement) or movement (e.g., angular velocity or acceleration) of one or more components of the boom assembly 102 or the work implement 120. In a particular application, the mass or weight of a payload particular to the application may accordingly be determined by the control system 200 based on the payload inputs provided by the onboard payload sensors 202 to the payload estimation/measurement logic 220 as may for example be executed by controller 212.

Figure 4:
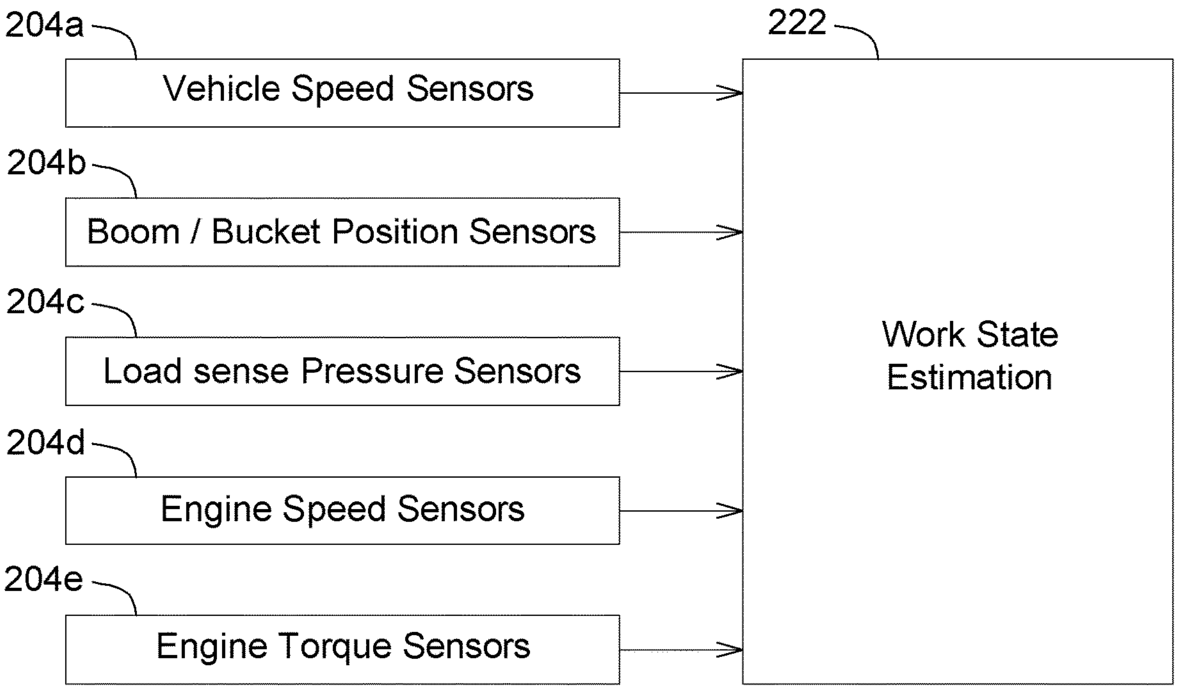
FIG. 4 is a block diagram representing exemplary inputs to work state estimation logic according to an embodiment of the present disclosure.

As represented in FIG. 4, exemplary work state estimation sensors 204 in the embodiment where the work machine 100 is a four-wheel drive loader may include wheel-based vehicle speed sensors 204*a* or transmission output speed sensors, position sensors 204*b* associated with the boom assembly 102 and/or work implement 120, load sense pressure sensors 204*c*, engine speed sensors 204*d*, engine torque sensors 204*e*, and/or any known alternatives as may be known to those of skill in the art. The work state estimation sensors 204 may be directly coupled to respective components to generate signals representing wheel speed, position, load, engine speed, engine torque, and the like, or in some embodiments some or all of these variables may be predicted or estimated from signals generated by sensors or other data sources indirectly corresponding thereto. In some embodiments, one or more of the work state sensors 204 referenced above may be replaced by monitored inputs from a user interface, corresponding for example to a commanded or otherwise intended value for a corresponding variable as an input to the work state estimation logic.

Imaging devices in the context of the position sensors 202*b*, 204*b* as discussed above may include cameras mounted on the work machine 100 and arranged to capture images corresponding to at least a field of view including the boom assembly 102 and/or the work implement 120. A camera system may include video cameras configured to record an original image stream and transmit corresponding data to the controller 212. In the alternative or in addition, the camera system may include one or more of an infrared camera, a stereoscopic camera, a PMD camera, or the like. The number and orientation of said cameras may vary in accordance with the type of work machine and relevant applications. Other imaging devices within the scope of the present disclosure may incorporate radar, lidar, etc. The imaging devices may in some embodiments be further or otherwise implemented for detecting and/or classifying the surroundings of the work machine 100, and various examples of which in addition or alternatively with respect to cameras may include ultrasonic sensors, laser scanners, radar wave transmitters and receivers, thermal sensors, structured light sensors, other optical sensors, and the like. The types and combinations of imaging devices in these contexts may vary for a type of work machine, work area, and/or application, but generally may be provided and configured to optimize recognition and classification of a material being loaded and unloaded, and work conditions corresponding to at least these work states, at least in association with a determined working area (loading, unloading, and associated traverse) of the work machine 100 for a given application.

In various embodiments, additional inputs to the controller 212 for implementation with payload estimation or measurement logic 220 and/or work state estimation logic 222 may be provided with respect to, for example, work machine operating conditions or positioning, material conditions corresponding to the payload being loaded and unloaded, ground surface conditions corresponding to an area traversed by the work machine while loaded, and the like, and may include or further refer to signals provided from the machine control system rather than discrete sensors.

In an embodiment, any of the aforementioned sensors may be supplemented using radio frequency identification (RFID) devices or equivalent wireless transceivers. Such devices may for example be implemented to determine and/or confirm a distance and/or orientation there between.

Figure 7:
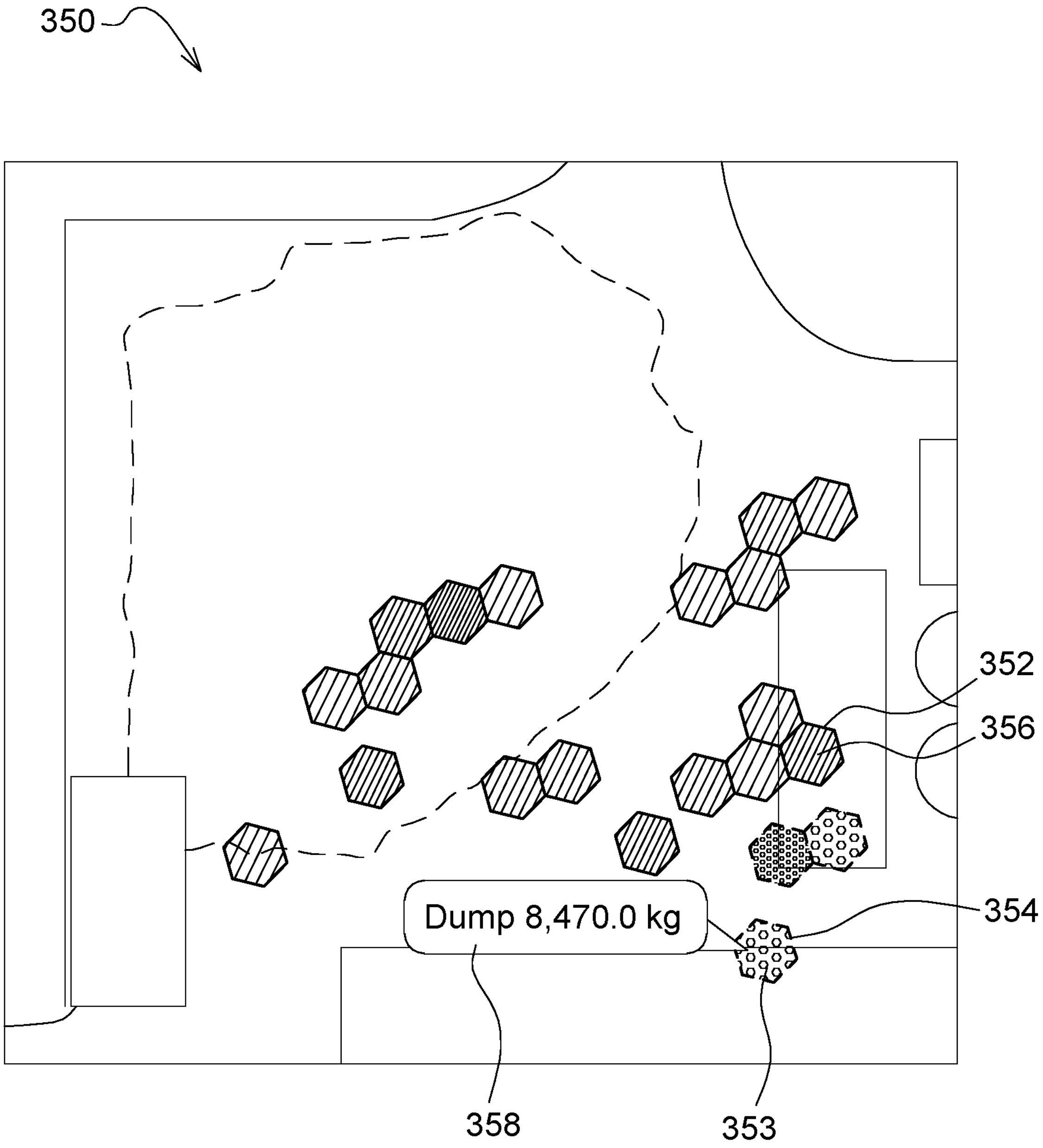
FIG. 7 is a graphical diagram representing an exemplary display generated in accordance with an embodiment of the present disclosure, including graphical productivity indicators.

The controller 212 may typically coordinate with the above-referenced user interface 216 for the display of various indicia to the human operator, as represented for example in FIG. 7. The controller may further generate control signals for controlling the operation of respective actuators, or signals for indirect control via intermediate control units, associated with a machine steering control system 224, a machine work implement control system 226, and/or a machine drive control system 228. The controller 212 may for example generate control signals for controlling the operation of various actuators, such as hydraulic motors or hydraulic piston-cylinder units, and electronic control signals from the controller 212 may actually be received by electro-hydraulic control valves associated with the actuators such that the electro-hydraulic control valves will control the flow of hydraulic fluid to and from the respective hydraulic actuators to control the actuation thereof in response to the control signal from the controller 212.

The controller 212 further communicatively coupled to a hydraulic system as machine work implement control system 226 may accordingly be configured to operate the work machine 100 and operate a work implement 120 coupled thereto, including, without limitation, the work implement's lift mechanism, tilt mechanism, roll mechanism, pitch mechanism and/or auxiliary mechanisms, for example and as relevant for a given type of work implement or work machine application.

The controller 212 further communicatively coupled to a hydraulic system as machine steering control system 224 and/or machine drive control system 228 may be configured for moving the work machine in forward and reverse directions, moving the work machine left and right, controlling the speed of the work machine's travel, etc. The drive control system 228 may be embodied as, or otherwise include, any device or collection of devices (e.g., one or more engine(s), powerplant(s), or the like) capable of supplying rotational power to a drivetrain and other components, as the case may be, to drive operation of those components. The drivetrain may be part of the drive control system 228 or may for example be embodied as, or otherwise include, any device or collection of devices (e.g., one or more transmission(s), differential(s), axle(s), or the like) capable of transmitting rotational power provided by the drive control system 228 to the wheels 122, 124 to drive movement of the work machine 100.

The controller 212 includes or may be associated with a processor 213, a computer readable medium 214, a communication unit 216, data storage 218 such as for example a database network, and the aforementioned user interface 216 or control panel having a display 210. It is understood that the controller 212 described herein may be a single controller having all of the described functionality, or it may include multiple controllers wherein the described functionality is distributed among the multiple controllers.

Various operations, steps or algorithms as described in connection with the controller 212 can be embodied directly in hardware, in a computer program product such as a software module executed by the processor 213, or in a combination of the two. The computer program product can reside in RAM memory, flash memory, ROM memory, EPROM memory, EEPROM memory, registers, hard disk, a removable disk, or any other form of computer-readable medium 214 known in the art. An exemplary computer-readable medium 214 can be coupled to the processor 213 such that the processor 213 can read information from, and write information to, the memory/storage medium 214. In the alternative, the medium 214 can be integral to the processor 213.

The term "processor" 213 as used herein may refer to at least general-purpose or specific-purpose processing devices and/or logic as may be understood by one of skill in the art, including but not limited to a microprocessor, a microcontroller, a state machine, and the like. A processor 213 can also be implemented as a combination of computing devices, e.g., a combination of a DSP and a microprocessor, a plurality of microprocessors, one or more microprocessors in conjunction with a DSP core, or any other such configuration.

The communication unit 216 may support or provide communications between the controller 212 and external systems or devices, and/or support or provide communication interface with respect to internal components of the work machine 100. The communications unit may include wireless communication system components (e.g., via cellular modem, WiFi, Bluetooth or the like) and/or may include one or more wired communications terminals such as universal serial bus ports.

The data storage 218 as discussed herein may, unless otherwise stated, generally encompass hardware such as volatile or non-volatile storage devices, drives, memory, or other storage media, as well as one or more databases residing thereon.

Figure 6:
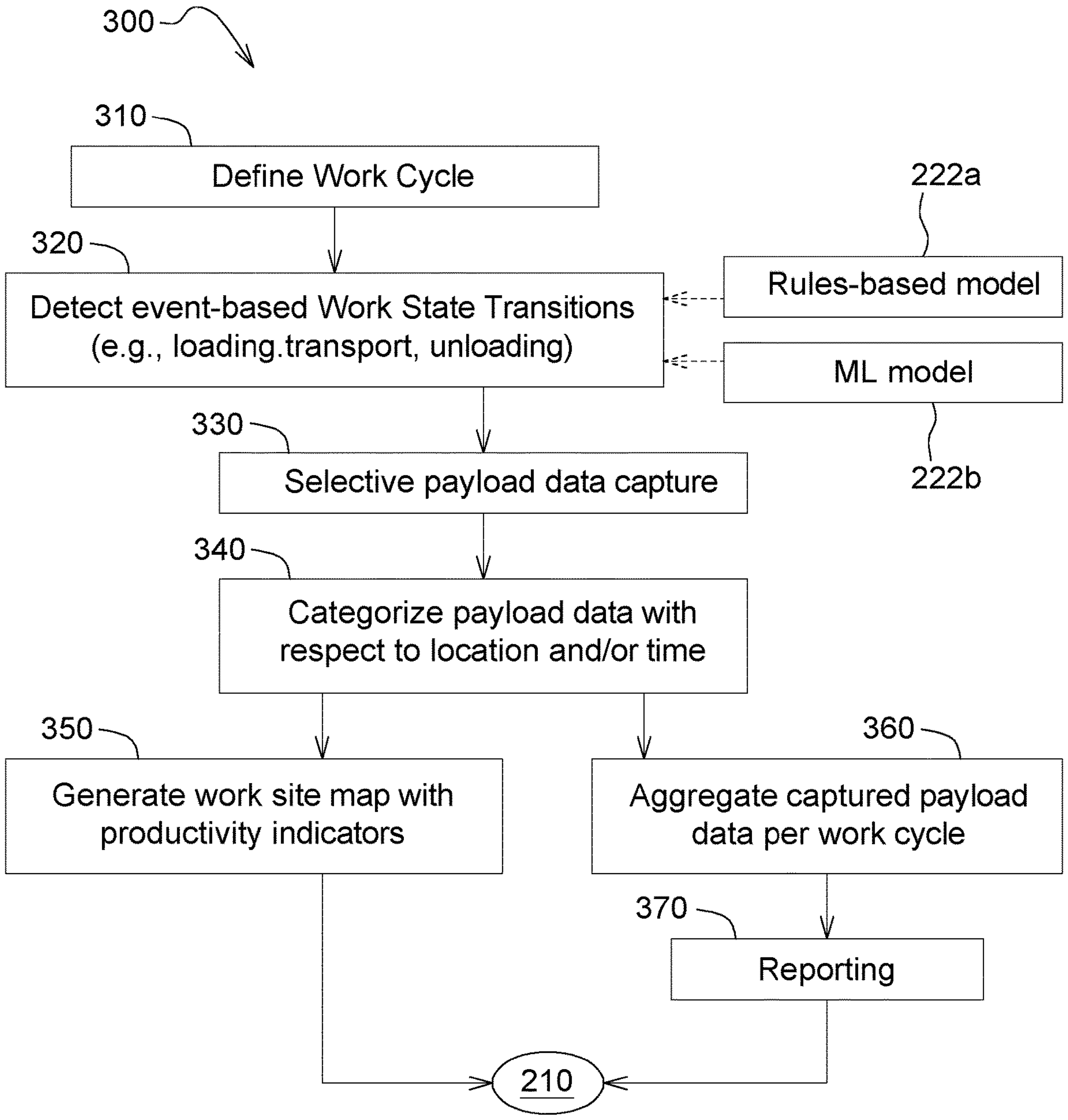
FIG. 6 is a flowchart representing an exemplary method according to an embodiment of the present disclosure.

Referring now to FIG. 6 for illustrative purposes, an embodiment of a method 300 according to the present disclosure may now be described regarding state-based payload capture, for example with respect to a work machine 100 as described above. The method 300 may be executed by the above-referenced controller 212, alone or in at least partial combination with separate components of a vehicle or machine control unit, mobile user devices, and/or distributed computing elements such as for example in a cloud computing environment.

As a preliminary step 310, the method 300 may include defining of a work cycle for the work machine 100. In some embodiments, this may be provided via user input for a particular work application, work site, work conditions, and the like. In other embodiments, the work cycle may be defined by the type of work machine 100 and selectively initiated when the work application begins, wherein this first step may be omitted. The work cycle includes a plurality of work states, which may generally be sequential. For example, a first work state may be defined in association with a loading operation, wherein a second work state may be defined in association with transport of the payload to another area, a third work state may be defined in association with an unloading operation, and a fourth work state may be defined in association with transport of the unloaded work machine prior to obtaining another payload. The first work state may however include multiple sub-states wherein for example the bucket is partially loaded at a first location and then more fully loaded at a second location, and some degree of transport takes place in between. In an embodiment, a work state transition from the first work state to the second work state may still be detected and implemented within the scope of the present method 300, even though the work machine 100 effectively returns from the second work state to the first work state in a non-sequential transition. In other embodiments, the work cycle may be defined such that only loading and unloading work states are detected, and transitions there between.

The method 300 accordingly includes a step 320 of detecting, at least via one or more work state estimation sensors 204 associated with the work machine 100 and as previously described herein, an event-based transition between work states in the work cycle.

Work state detection and corresponding transitions there between may in an embodiment be treated a classical sequence classification problem, addressed in an embodiment as disclosed herein by building supervised Machine Learning (ML)/Deep Learning (DL) classification algorithms like Logistic Regression and Long Short-Term Memory (LSTM) recurrent neural network models for sequence classification. The LSTM models are capable of learning from internal representations of the time series data, effectively remembering over long sequences of input data and previous operation of the work machine (alone or in combination for example with other such work machines). The LSTM models may accordingly be trained on time series data from the work state sensors 204 associated with the work machine 100 and observe loss and accuracy values over N training iterations, wherein losses are decreased and accuracy increased over time. The model may be described as classifying these time series data into defined work states.

In a embodiment, for generation of the model, the time series data may for example be streamed from the respective work state sensors/data sources 204 on a work machine 100 (or a plurality of analogous work machines) via a communications network onto a cloud server network, wherein the model is developed (i.e., trained and validated) by one or more processors at the cloud server level. Once the model has been sufficiently validated, it may be transmitted, for example via the communications network, and deployed by the controller 212 onboard a work machine 100 for subsequent work state estimation and work load estimation. The cloud server network may however continue to receive input time series data from the work machine 100 (or plurality of analogous work machines) for the purpose of further refining the model, wherein updated versions of the model may be transmitted to the work machine 100 periodically or on demand. In certain embodiments the model may itself, in accordance with methods as otherwise described herein, be at least in part implemented by the one or more processors at the cloud server level rather than fully by the controller 212.

With such a model being available to the controller 212, and upon receiving input signals from one or more of the sensors 204 during a current work cycle, a current work state may accordingly be detected based on a comparison of the received input signals to the classified combinations of data (corresponding to the detected current work state), and the process is repeated when subsequent input signals correspond to a different one of the work states associated with the current work cycle.

In other embodiments, work state detection and corresponding transitions may be fixed algorithm- or rules-based, rather than relying on learning techniques. Accordingly, a specified input or combination of inputs may be predetermined as correlating to a work state, with this correlation being for example flagged for retrieval by the controller 212 upon identifying the specified input or combination of inputs.

The method 300 continues in step 330 by selectively capturing payload data corresponding to the current work cycle from one or more onboard payload measuring sensors 202, further upon analysis by payload estimation/measurement logic 220 of the control system 200, in association with the detected transition. In an embodiment, the event-based transition corresponds to a transition from an unloaded transport work state to a loading work state, wherein the selectively captured payload data is captured after detection of the event-based transition and accordingly during the loading work state, and until detection of a further transition from the loading work state to a subsequent (e.g., transport) work state.

In various embodiments, payload data is continuously generated by the payload estimation/measurement logic 220 based on estimates and/or measurements using at least the payload sensors 202, but the selectively captured payload data specifically excludes any payload data generated other than in the loading work state.

In one alternative embodiment, the selectively captured payload data is captured as a discrete measurement after (e.g., immediately after) detecting an event-based transition from the loading operation, or as a blended average of several measurements after the same event-based transition, optionally with data processing for example to exclude outliers in the measurement data stream.

The captured payload data may be stored in data storage and categorized in step 340 with respect to one or more associated locations within a work site, for example loading and unloading locations corresponding to the respective work states, and/or with respect to time.

The illustrated method 300 may in an embodiment continue in step 350 by generating a dashboard which may include a representative display of the work site, such as for example a work site map, which includes indicators corresponding to a location and a value of the respective selectively captured payload data using the method 300. Referring for example to FIG. 7, an exemplary work site map includes numerous first indicators 352 representing locations where material has been loaded (i.e., corresponding to detected loading work states or associated event-based transitions) and second indicators 356 representing locations where material has been unloaded (i.e., corresponding to detected unloading work states or associated event-based transitions).

The first indicators 352 in the present example are filled in with progressively spaced dashed lines 353 representing a relative amount/magnitude of an increase in the selectively captured payload data during or corresponding to the loading work state. In an embodiment, as mentioned above, the selectively captured payload data for a first location may still be carried in the bucket when another loading operation at a second location is performed, wherein only an increase in the selectively captured payload data during the loading work state corresponding to the second location is actually attributed to the second location in the work site map (and in productivity reports as noted below).

The second indicators 354 in the present example are likewise filled in with progressively spaced dots or circles 356 representing a relative amount/magnitude of a decrease in the selectively captured payload data during or corresponding to the unloading work state. In an embodiment, some of the selectively captured payload data prior to an unloading operation for a first location may still be carried in the bucket until another unloading operation at a second location is performed, wherein only a decrease in the selectively captured payload data during the unloading work state corresponding to the second location is actually attributed to the second location in the work site map (and in productivity reports as noted below).

As further represented in FIG. 7, additional indicators or other information may be provided such as for example a numerical indicator 358 of the actual amount of loaded or unloaded material at the given location. In various embodiments, such numerical indicators or other more detailed information may be dynamically presented upon user selection or other interaction with the generated work site map, such as for example engagement of a touch screen at the corresponding location or dragging an icon over the location with a mouse. In some embodiments, such user input can also be used for example to further classify characteristics of the locations within the work site map, classify characteristics of the material being loaded or unloaded from a given location, and/or provide other inputs that can be used in productivity reporting, for improving the supervised learning models for work state classification, and the like.

Figure 5:
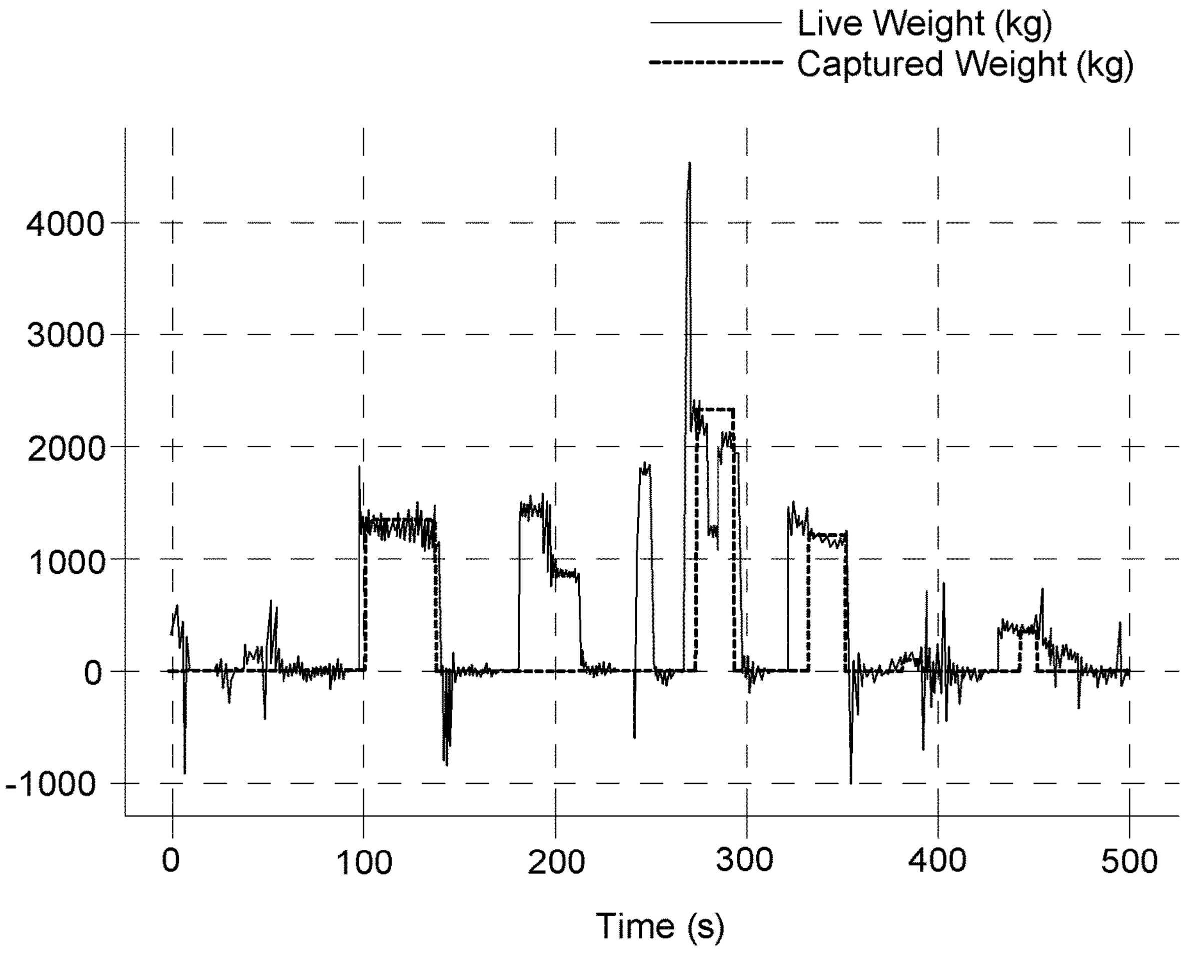
FIG. 5 is a graphical diagram representing live versus captured payload weight with respect to time in accordance with an embodiment of the present disclosure.

A user receiving or otherwise accessing the above-reference site map can observe areas or regions corresponding to most of the productive material removal, and further that the material is flowing to two main locations. The user may utilize this feature to track how much of each material is removed per day, for example for commodity tracking. Using a raw “live weight” signal according to conventional techniques, as represented in FIG. 5, would add error to this model as it would include the non-productive work (pile clean up), and would over-estimate loads from pile impacts.

The illustrated method 300 may further, or as an alternative with respect to step 350, continue in step 360 by aggregating the selectively captured payload data with respect to other captured payload data for each of a plurality of work cycles for the work machine, and generating productivity reports in step 370 which may be transmitted on request or as push notifications, reviewed from a remote device having authorization to access a hosted reporting module or data repository, and/or the like. Whereas productivity in the context of the embodiments described above may be characterized in terms of selectively captured payload in a given work state, in other embodiments and particularly for other work machines 100 the productivity may be gauged using alternative metrics, variables, and the like.

As used herein, the phrase “one or more of,” when used with a list of items, means that different combinations of one or more of the items may be used and only one of each item in the list may be needed. For example, “one or more of” item A, item B, and item C may include, for example, without limitation, item A or item A and item B. This example also may include item A, item B, and item C, or item Band item C.

One of skill in the art may appreciate that when an element herein is referred to as being “coupled” to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method of state-based payload capture by a work machine comprising a plurality of ground engaging units supporting a main frame, and at least one work implement moveable with respect to the main frame and configured for loading and unloading a payload, the method comprising:

classifying over time combinations of data from one or more sensors associated with the work machine into different predetermined work states, and generating a learning model trained to correlate data from at least one of the one or more sensors as relating to productive work during one or more of the work states;

during a current work cycle:

detecting, at least via the one or more sensors associated with the work machine, event-based transitions between the work states;

detecting at least a first work state in the current work cycle correlating to non-productive work based on a comparison of the received input signals to the classified combinations of data, and detecting at least a second work state in the current work cycle correlating to productive work based on a subsequent comparison of the received input signals to the classified combinations of data;

selectively capturing payload data corresponding to the at least second work state in the current work cycle from an onboard payload measuring unit in association with the detected transition;

detecting and classifying, at least via a further one or more sensors associated with the work machine, a type of material being loaded from a first location and subsequently unloaded in a second location by the work machine in association with the payload;

categorizing the captured payload data and the type of material at least in data storage, independently for the current work cycle with respect to one or more associated locations within a work site and/or with respect to time, and in aggregate with other captured payload data and types of material for each of a plurality of work cycles for the work machine, and generating a representative display of the work site on a display unit, the representative display comprising one or more indicators corresponding to at least the first location and the second location, and aggregate values corresponding to the respective selectively captured payload data and tracking relative increases or decreases at each of the first location and the second location for each type of material;

wherein the selectively captured payload data corresponding to the at least second work state in the current work cycle is independent of payload data corresponding to the at least first work state, wherein productive material removal is not over-estimated via the representative display.

2. The computer-implemented method of claim 1, wherein the selectively captured payload data comprises a representative payload value for the at least second work state.

3. The computer-implemented method of claim 1, wherein payload data is continuously generated by the onboard payload measuring unit, and wherein the selectively captured payload data excludes payload data generated other than in the at least second work state.

4. The computer-implemented method of claim 1, wherein the first work state comprises a loading operation utilizing the at least one work implement.

5. The computer-implemented method of claim 1, wherein the one or more sensors associated with the work machine comprise at least one sensor of the onboard payload measuring unit.

6. The computer-implemented method of claim 1, wherein the onboard payload measuring unit comprises one or more position sensors, and one or more hydraulic pressure sensors.

7. The computer-implemented method of claim 1, wherein the one or more sensors associated with the work machine comprise one or more sensors configured to generate output signals representative of wheel speed, positions of the at least one work implement, load sense pressure, engine speed, and engine torque.

8. A system for state-based payload capture comprising:

a work machine comprising a plurality of ground engaging units supporting a main frame, and at least one work implement moveable with respect to the main frame and configured for loading and unloading a payload;

a first set of one or more sensors associated with the work machine and configured to generate output signals representative of work states thereof;

an onboard payload measuring unit comprising a second set of one or more sensors configured to generate output signals representative of a current payload for the at least one work implement;

a third set of sensors comprising one or more imaging devices configured to generate output signals corresponding to a material being loaded and unloaded in association with the current payload; and one or more processors functionally linked to the each of the sensors and configured to classify over time combinations of data from one or more sensors associated with the work machine into different predetermined work states, and to generate a learning model trained to correlate data from at least one of the one or more sensors as relating to productive work during one or more of the work states;

wherein the one or more processors are further configured, during a current work cycle having a sequence of work states therein, to:

detect, at least via the first set of one or more sensors associated with the work machine, event-based transitions between the work states;

detect at least a first work state in the current work cycle correlating to non-productive work based on a comparison of the received input signals to the classified combinations of data, and detect at least a second work state in the current work cycle correlating to productive work based on a subsequent comparison of the received input signals to the classified combinations of data;

selectively capture the payload data corresponding to the at least second work state in the current work cycle from the second set of one or more sensors in association with the detected transitions;

detect and classify a type of material being loaded from a first location and subsequently unloaded in a second location by the work machine in association with the payload;

categorize the captured payload data and the type of material at least in data storage, independently for the current work cycle with respect to one or more associated locations within a work site and/or with respect to time, and in aggregate with other captured payload data and types of material for each of a plurality of work cycles for the work machine; and generate a representative display of the work site on a display unit, the representative display comprising one or more indicators corresponding to at least the first location and the second location, and aggregate values corresponding to the respective selectively captured payload data and tracking relative increases or decreases at each of the first location and the second location for each type of material;

wherein the selectively captured payload data corresponding to the at least second work state in the current work cycle is independent of payload data corresponding to the at least first work state, wherein productive material removal is not over-estimated via the representative display.

9. The system of claim 8, wherein the selectively captured payload data comprises a representative payload value for the at least second work state.

10. The system of claim 8, wherein payload data is continuously generated by the onboard payload measuring unit, and wherein the selectively captured payload data excludes payload data generated other than in the at least second work state.

11. The system of claim 8, wherein the first work state comprises a loading operation utilizing the at least one work implement.

12. The system of claim 8, wherein the first set of one or more sensors associated with the work machine comprise at least one sensor of the onboard payload measuring unit.

13. The system of claim 8, wherein the onboard payload measuring unit comprises one or more position sensors, and one or more hydraulic pressure sensors.

14. The system of claim 8, wherein the one or more sensors associated with the work machine comprise one or more sensors configured to generate output signals representative of wheel speed, positions of the at least one work implement, load sense pressure, engine speed, and engine torque.

* * * * *